United States Patent
Yin et al.

(10) Patent No.: US 8,687,328 B2
(45) Date of Patent: Apr. 1, 2014

(54) PHOTOVOLTAIC INVERTER WITH CONTROL FOR PERFORMING LOW VOLTAGE RIDE THROUGH

(75) Inventors: Jun Yin, Livermore, CA (US); Renjie Xu, Livermore, CA (US)

(73) Assignee: Schneider Electric Solar Inverters USA, Inc., Livermore, CA (US)

( * ) Notice: Subject to any disclaimer, the term of this patent is extended or adjusted under 35 U.S.C. 154(b) by 353 days.

(21) Appl. No.: 12/902,730

(22) Filed: Oct. 12, 2010

(65) Prior Publication Data

US 2012/0087048 A1    Apr. 12, 2012

(51) Int. Cl.
*H02H 9/00* (2006.01)
*H02J 7/00* (2006.01)
*H02H 3/20* (2006.01)
*H02H 9/04* (2006.01)

(52) U.S. Cl.
USPC ............................. 361/56; 307/66; 361/91.1

(58) Field of Classification Search
USPC ............. 361/54, 18, 56, 91.1; 307/48, 66, 67; 363/95
See application file for complete search history.

(56) References Cited

U.S. PATENT DOCUMENTS

| | | | |
|---|---|---|---|
| 7,786,694 B2 * | 8/2010 | Kneller | 318/800 |
| 2009/0284198 A1 * | 11/2009 | Shimana et al. | 318/400.21 |
| 2011/0128760 A1 * | 6/2011 | Yuan et al. | 363/50 |

FOREIGN PATENT DOCUMENTS

CN         101697418 A      4/2010

OTHER PUBLICATIONS

Chi Jin, et al., Enhancement of Low Voltage Ride-Through Capability for Wind Turbine Driven DFIG with Active Crowbar and Battery Energy Storage System, 2010 IEEE, IEEE, Piscataway, NJ, USA, Jul. 25, 2010 (8 pages).
International Search report for International Application No. PCT/US2011/055099, filed Oct. 6, 2011, dated Jun. 27, 2012 (4 pages).
Written Opinion for International Application No. PCT/US2011/055099, filed Oct. 6, 2011, dated Jun. 27, 2012 (5 pages).
Three Phase Xantrex GT500 E Grid Tie Solar Inverter Brochure dated 2010, 2 pages.
Three Phase Xantrex GT630 E Grid Tie Solar Inverte Brochure; dated 2010, 2 pages.

* cited by examiner

*Primary Examiner* — Stephen W Jackson
*Assistant Examiner* — Christopher Clark (57) ABSTRACT

A photovoltaic inverter for coupling a direct current photovoltaic source to an alternating current energy grid and performing a low voltage ride through. The inverter includes a power bridge to convert direct current voltage to alternating current voltage. A switching crowbar is coupled to the photovoltaic energy source and the power bridge. The crowbar has a switching device having a closed position causing the switching crowbar to dissipate energy from the photovoltaic energy source and an open position to allow direct output from the photovoltaic source to the power bridge. A voltage sensor detects a low voltage condition on the grid. A controller is coupled to the voltage sensor and controls the switching crowbar when a low voltage condition is detected. The switching device is placed in the closed position when the voltage from the photovoltaic energy source is higher than a predetermined threshold voltage and the switching device being placed in the open position when the voltage of the photovoltaic source reaches the voltage when the low voltage condition is detected.

20 Claims, 8 Drawing Sheets

PHOTOVOLTAIC INVERTER WITH CONTROL FOR PERFORMING LOW VOLTAGE RIDE THROUGH

FIELD OF THE INVENTION

The present disclosure relates generally to inverters for photovoltaic ("PV") power plants and more particularly, to a crowbar control circuit in a photovoltaic inverter to perform low voltage ride through.

BACKGROUND

The drive for alternative energy has increased development of photo-voltaic ("PV") power plants that may be connected to the electrical grid. A PV power plant has an inverter which converts direct current voltage from a PV source, such as solar panels, to alternating current voltage suitable for connection to the electrical grid. As more and more large-scale PV power plants are put into operation due to the increasing green energy requirements, utilities are applying more and more regulations on PV power plants, since the quality and stability of a power system may be affected by the installation of PV power plants. Presently, some European countries such as France and Germany are requiring that PV power plants which are connected to a medium voltage grid are capable of performing a low voltage ride through ("LVRT") operation. The LVRT operation means once the grid voltage dips 10% to 95% of its nominal value, any individual PV inverter in a PV plant can still output the same amount of current as before the grid voltage dip for a specified period of time.

Recently, as the capacity of single PV power plants has increased rapidly, the emphasis on high PV voltage installations is getting higher because such installations can lower the installation cost. An open circuit voltage of about 1000V is currently desired from many PV installers. Facing this challenge, PV inverter manufacturers have two options: use high-voltage switching devices such as 1700V insulated gate bipolar transistors ("IGBT") to build the power conversion bridge for PV inverters; or use regular voltage switching devices such as 1200V IGBTs in order to acquire high power conversion efficiency in inverters. Use of high-voltage switching devices is relatively expensive because of the higher voltage requirements. However, there are several challenges in use of regular voltage switching devices such as 1200V IGBTs for 1000V PV systems, one of which is the implementation of LVRT in PV inverters which may expose such switching devices to higher voltages than their operational design.

In general, running 1200V IGBTs above 850V at full load is not recommended for the safety of the IGBTs and the inverter. However 1200V IGBTs may be theoretically used for a 1000V PV installation since the Maximum Power Point Tracking ("MPPT") voltage of this kind of PV installation will be less than 850V and usually less than 700V. However, as the grid voltage dip occurs, the DC voltage of the PV inverter may jump higher than 850V due to the instant energy build-up at the DC side. The IGBTs in the power bridge may fail in this situation and therefore the PV plant cannot perform LVRT. Thus, it would be desirable to have an inverter with relatively lower voltage components that can perform LVRT.

BRIEF SUMMARY

Aspects of the present disclosure include a method of regulating the voltage output of an inverter coupled between a photovoltaic source and a power grid to perform a low voltage ride through operation through operation. An occurrence of low voltage is sensed on the power grid. A crowbar circuit is controlled with a switching device in parallel with the photovoltaic source to create a closed circuit to dissipate power from the photovoltaic source at a pre-determined threshold voltage. The crowbar circuit opens the closed circuit when the voltage from the photovoltaic source is at substantially the operating voltage of the photovoltaic source just prior to the occurrence of the low voltage.

Another aspect of the present disclosure is a photovoltaic inverter for coupling a direct current photovoltaic source to an alternating current electrical grid and performing a low voltage ride through (LVRT) operation. The inverter includes a power bridge to convert direct current voltage to alternating current voltage. The power bridge is coupled to the electrical grid. A switching crowbar is coupled to the photovoltaic energy source and the power bridge. The crowbar has a switching device has a closed position causing the switching crowbar to dissipate energy from the photovoltaic energy source and an open position to allow direct output from the photovoltaic source to the power bridge. A voltage sensor detects a low voltage condition on the grid. A controller is coupled to the voltage sensor and controls the switching crowbar when a low voltage condition is detected. The switching device is placed in the closed position when the voltage from the photovoltaic energy source is higher than a predetermined threshold voltage and the switching device is placed in the open position when the voltage of the PV source reaches the voltage when the low voltage condition is detected.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
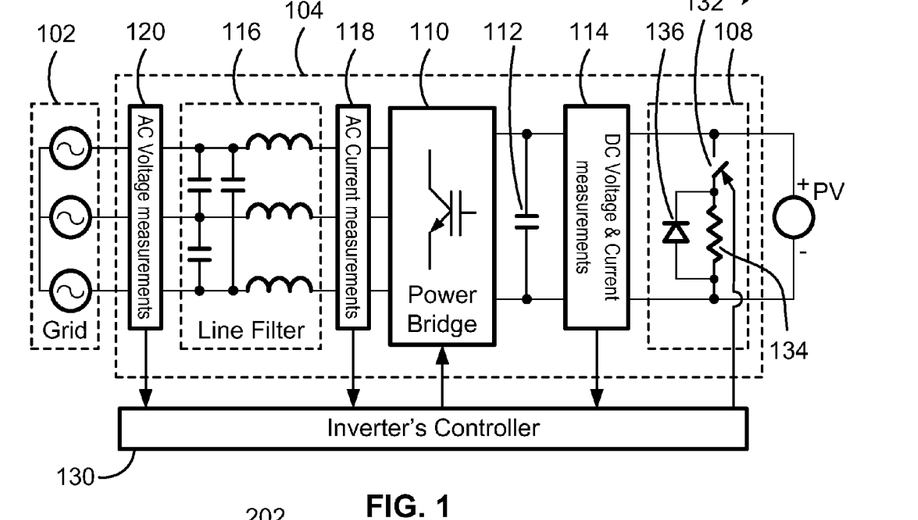
FIG. 1 is a functional block diagram of a PV grid tie inverter that may include a crowbar module to control power output for performing low voltage ride through ("LVRT")

FIG. 1 is a functional block diagram of a photovoltaic ("PV") power plant system 100 allowing LVRT operation with lower voltage bridge components. The power plant system 100 outputs power to an electrical grid 102. In this example, the grid 102 has three phased voltage inputs coupled to a grid tie inverter 104. The power plant system 100 includes the grid tie inverter 104 that is coupled between the electrical grid 102 and a photovoltaic ("PV") power source 106. A crowbar switching module 108 controls the voltage output from the PV power source 106. The inverter 104 includes a power bridge 110 that converts direct current voltage from the PV power source 106 to alternating current suitable for the electrical grid 102. The power bridge 110 in this example includes medium voltage IGBTs (not shown) which have a maximum breakdown voltage and corresponding diodes (not shown). Of course, different voltage IGBTs and other switching devices may be used for the power bridge 110. The power bridge 110 uses a DC capacitor 112 to control the voltage of the PV source 106 and to convert direct current into alternating current. A DC voltage and current sensor 114 provides voltage and current measurements from the voltage generated from the PV power source 106.

The alternating current output of the power bridge 110 is filtered via a line filter 116 which outputs the current into the three phased voltage inputs of the grid 102. The AC output current is measured by a current sensor 118 and the output voltages are measured by a voltage sensor 120. A controller 130 is coupled to the sensors 114, 118 and 120. The controller 130 also controls the state of the crowbar module 108 and the power bridge 110.

The crowbar module 108 includes a switching device 132 which in this example is an IGBT. The switching device 132 is coupled in series with a resistor 134 and a diode 136 which are coupled in parallel. As will be explained below, the resistor 134 absorbs excess power from the PV source 106 when the switching device 132 is closed. The diode 136 operates as a free wheel to allow current dissipation for extra energy from the PV source 106.

Once a voltage dip occurs in the grid 102, the extra energy produced by the PV source 106 will cause the increase of PV voltage due to the reduction of the output power at the inverter 104. For example, the voltage of the grid 102 may drop to 5% of nominal value, which may cause the voltage from the PV source 106 to rise up close to the open voltage of the PV source 106. Operating the inverter 104 at a higher DC voltage than permitted may damage the switching devices of the bridge 110 of the inverter 104 since such switching devices in this example are not capable of handling the higher voltage.

As will be described, the controller 130 runs an algorithm to protect the switching devices of the bridge 110 while the inverter 104 performs LVRT. The controller 130 controls the crowbar module 108 across the PV source 106 in order to dissipate the extra energy stored in the PV source 106 and therefore maintain a proper PV voltage to operate the inverter 104 in LVRT. The controller 130 also controls the current output of the power bridge 110 via switching the IGBTs in the power bridge 110. The controller 130 detects a voltage dip from the grid 102 via the voltage sensor 120 which requires a LVRT. The controller 130 starts the on and off control of crowbar module 108 across the PV by using the switching device 132. The controller 130 turns the crowbar module 108 on by closing the switching device 132 thereby dissipating extra energy from the PV source 106 via the resistor 134 and the diode 136 when the PV voltage of the PV source 106 exceeds a threshold voltage. In this example, the threshold voltage is ΔV higher than the PV voltage prior to the low voltage leading to the LVRT operation. The crowbar module 108 is turned off by opening the switching device 132 once the voltage from the PV source 106 reaches the PV voltage level just before the initiation of the LVRT operation.

Figure 2:
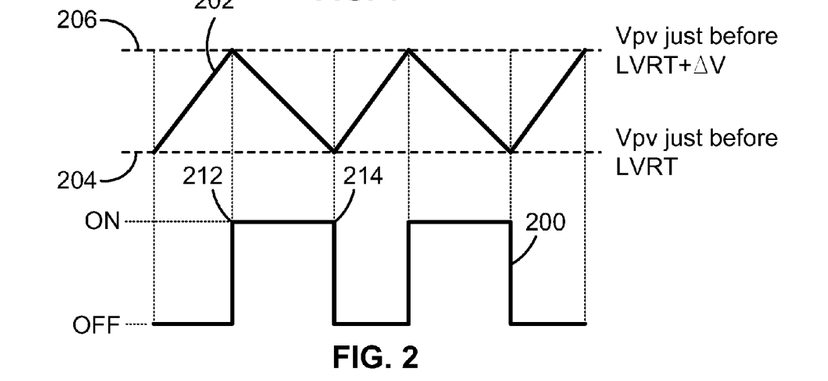
FIG. 2 is a timing diagram for the control signals switching the crowbar module in the inverter in FIG. 1.

The sequence of the bang-bang control is shown in FIG. 2 which is a timing diagram of the state of the crowbar module 108. FIG. 2 includes a control signal trace 200 of the on and off state of the switching device 132 of the crowbar module 108 in FIG. 1. FIG. 2 includes a voltage trace 202 of the output voltage from the PV source 106. A bottom dashed line 204 represents the operating voltage level output from the PV source 106 just before the low voltage condition that requires LVRT operation. The operating voltage level is well below the maximum operating voltage output from the PV source 106. A top dashed line 206 represents the voltage level of the PV source 106 just before the low voltage condition with a ΔV value added. Once the controller 130 senses a low voltage level at the grid 102, the controller 130 determines the voltage level of the PV source 106 and stores the value. The controller 130 monitors the voltage level 202 of the PV source 106 which begins to ramp up over the operating voltage level 204 prior to the grid voltage dip. When the voltage level 202 reaches the threshold level 206 (the voltage level when the LVRT is initiated with the ΔV value added), the crowbar module 108 is switched on by closing the switching device 132 as shown by the trace 200 at a point 212. The resistor 134 and diode 136 are placed in parallel with the PV source 106 by closing the switching device 132. The power from the PV source 106 is dissipated over the resistor 134 and diode 136 free wheels to dissipate current. The voltage output from the PV source 106 falls as shown by the trace 202. When the voltage falls to the voltage level 204 just before the grid voltage dip causing the LVRT operation as shown in the trace 202, the crowbar module 108 is switched off by opening the switching device 132 as shown by the signal trace 200 at a point 214. The voltage from the PV source 106 thus begins to rise again as shown by the trace 202. This process allows the inverter 104 to maintain current output to the grid 102 at a level substantially the same as prior to the grid voltage dip causing the LVRT operation. The crowbar module 108 protects the switching devices in the power bridge 110 from high voltages of the PV source 106.

The relationship between PV power from the power source 106 and the PV voltage is a group of curves that vary according to irradiance and temperature. However, the PV voltage is relatively constant over a wide range of irradiance and temperature. The crowbar module 108 in this example is able to handle the maximum PV power ($P_{pv\text{-}max}$) from the PV source 106 for a specified period of time (T). Since the PV voltage is usually regulated at around the maximum power point by the inverter 104 and also considering the ΔV for band control, the resistance value (R) of the resistor 134 in the crowbar module 108 is chosen by $$R = (V_{pv\text{-}max} + \Delta V)^2 / P_{pv\text{-}max} \quad (1)$$

In this equation $V_{pv\text{-}max}$ is the maximum voltage at the maximum power point of the PV source 106. Thus, the resistance value may be obtained for specific maximum voltages and power. For example, if $V_{pv\text{-}max}$ is 700V and $P_{pv\text{-}max}$ is 575 kW then R is 0.978 Ohm.

The ΔV component of the threshold voltage may be varied to optimize the performance of the crowbar module 108. In this example, ΔV is set as 10% of minimum PV operation voltage. Therefore if the minimum PV operation voltage is 500V then the ΔV value is selected as 50V.

Based on the selection of the crowbar module 108, the maximum upper limit of the bang-bang control is selected as the voltage at maximum power point of the PV source 106 plus 50V. This selection can guarantee that the crowbar handle the maximum PV power even though the inverter output power is down to zero.

Figure 3:
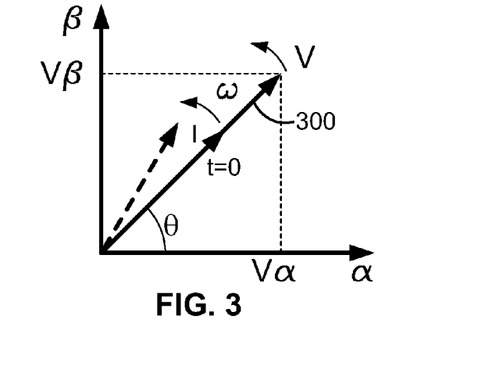
FIG. 3 is a graph showing the current reference used for vector current control of the inverter in FIG. 1 to insure the previous current level maintained during LVRT.
Figure 4A:
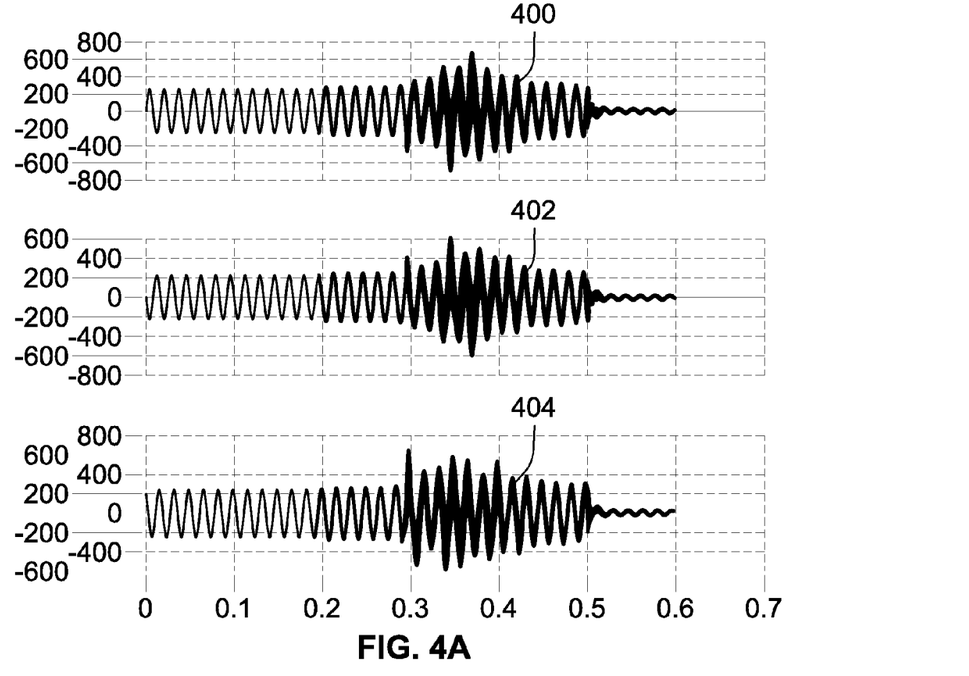
FIG. 4A-4C are simulation results showing grid voltage, voltage regulation and output current using the inverter in FIG. 1 at a PV voltage of 800 volts during LVRT.
Figure 4B:
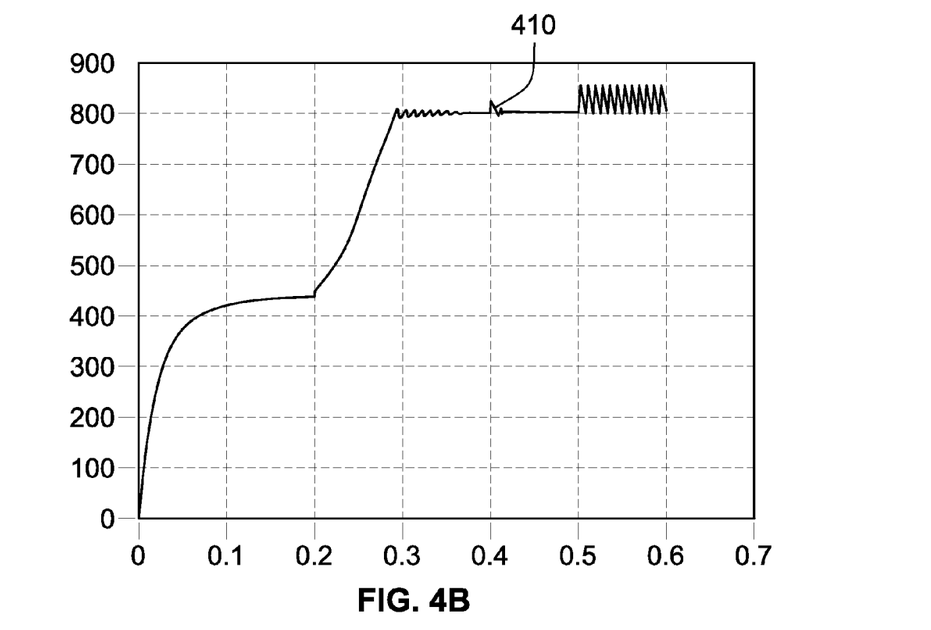
Figure 4C:
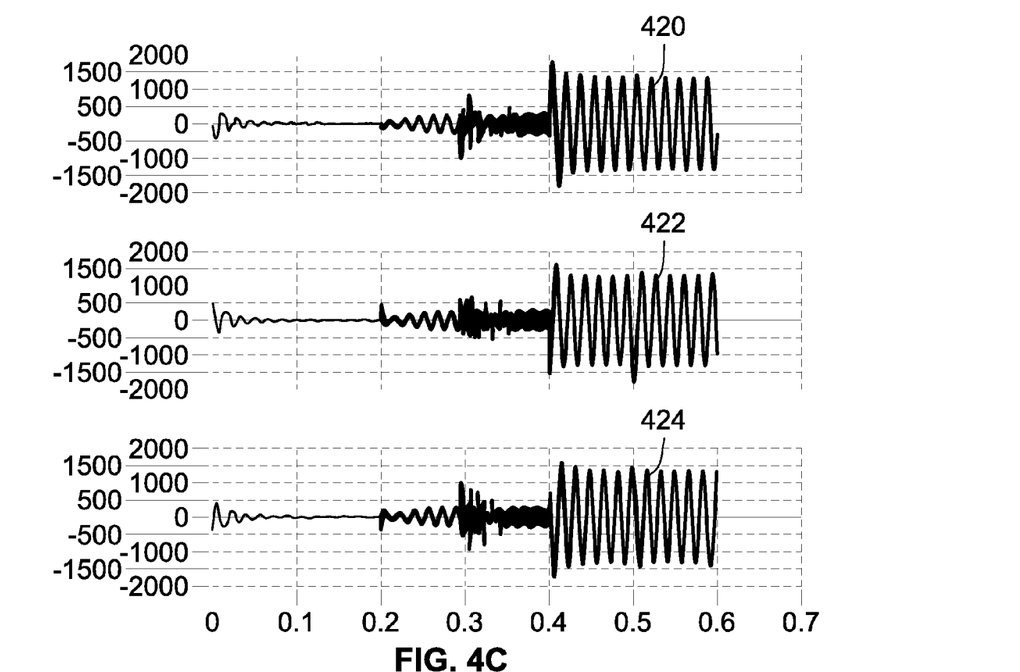

Once the grid voltage dips significantly and the inverter 104 still needs to output large amount of current due to the LVRT requirements, the traditional synchronization method such as phase lock loop ("PLL") or filter related techniques may not work properly due to the high voltage pollution on the small grid voltage by the inverter 104. If the grid voltage dip is unsymmetrical, it is difficult for a conventional inverter to still generate the symmetrical current when it is in LVRT operation. The inverter 104 in FIG. 1 uses a replica of the current reference frame just before the LVRT operation. The controller 130 uses the replica to control the current output by the power bridge 110 to the level just before the voltage dip triggering the LVRT operation. FIG. 3 is a graph of the simulation of a voltage vector 300 when the voltage dip appears at time=0. The voltage vector 300 is the combination of the voltage of the three phased inputs of the grid 102. The location of the current reference vector is obtained by the location of voltage vector just before the LVRT in the α-β reference frame.

$$i_\alpha = I\cos(\omega t + \theta)$$

$$i_\beta = I\sin(\omega t + \theta) \quad (2)$$

where $\theta = \tan^{-1}(V_\beta/V_\alpha)$, $\omega = 2\pi f$, f is the grid frequency before the LVRT FIG. 4A is a series of voltage graphs including voltage traces 400, 402 and 404 against time of the voltage from each of the three phased inputs of the grid 102. In FIG. 4A, the voltage on the grid 102 drops to 5% of the nominal at 0.5 seconds in the voltage traces 400, 402 and 404. The power bridge 110 is put on line by the controller 130 at 0.3 seconds. The PV source 106 is then placed on line to the grid 102 at 0.4 seconds. The simulation in FIG. 4A uses a PV source such as the PV source 106 in FIG. 1 with an open voltage of 996V, a short circuit current at 673 A and maximum power at 502 kW at 800V. FIGS. 4A-C show the entire process of the operation of the inverter 104 in FIG. 1 under these conditions.

The voltage regulation of the inverter 104 via the control of the crowbar module 108 is shown in the voltage trace 410 in FIG. 4B which is voltage from the PV source 106 from the crowbar module 108 to the DC input of the bridge 110. As shown in FIG. 4B, the voltage output increases to 800 volts at 0.3 seconds when the PV source 106 is placed on line. The voltage output is maintained at 800 volts between 0.3 seconds and 0.4 seconds. The low voltage dip occurs at the grid 102 at 0.5 seconds and the voltage of the PV source 106 output to the power bridge 110 begins to increase. At 850 volts, the crowbar module 108 is activated and the voltage drops. The voltage output of the PV source 106 to the bridge 110 fluctuates between 800V and 850V thereafter due to the switching of the crowbar module 108 after the low voltage condition occurs at 0.5 seconds resulting in LVRT operation.

FIG. 4C shows current traces 420, 422 and 424 of each of the three phase outputs of the bridge 110 coupled to the grid 102. The current reference vector will be set as same as before the LVRT operation by the controller 130 controlling the switching devices of the bridge 110 as shown in the output current traces 420, 422 and 424 in FIG. 4C. The output current traces 420, 422 and 424 show the current output of three phases after the LVRT operation occurs at 0.5 seconds. The location of the current reference vector is obtained by the location of voltage vector just before the LVRT in the α-β reference frame as explained above when the inverter 104 is put on line at 0.4 seconds. The current is replicated after the LVRT operation at 0.5 seconds as shown in the current traces 420, 422 and 424 in FIG. 4C.

Figure 5A:
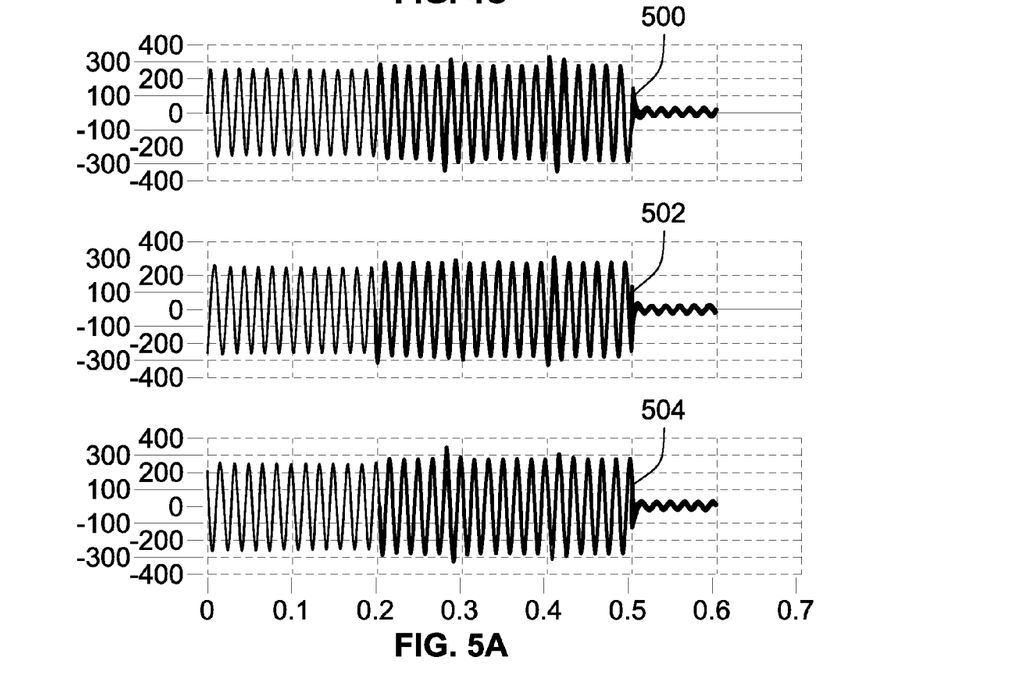
FIG. 5A-5C are simulation results showing grid voltage, voltage regulation and output current using the inverter in FIG. 1 at a PV voltage of 650 volts during LVRT.
Figure 5B:
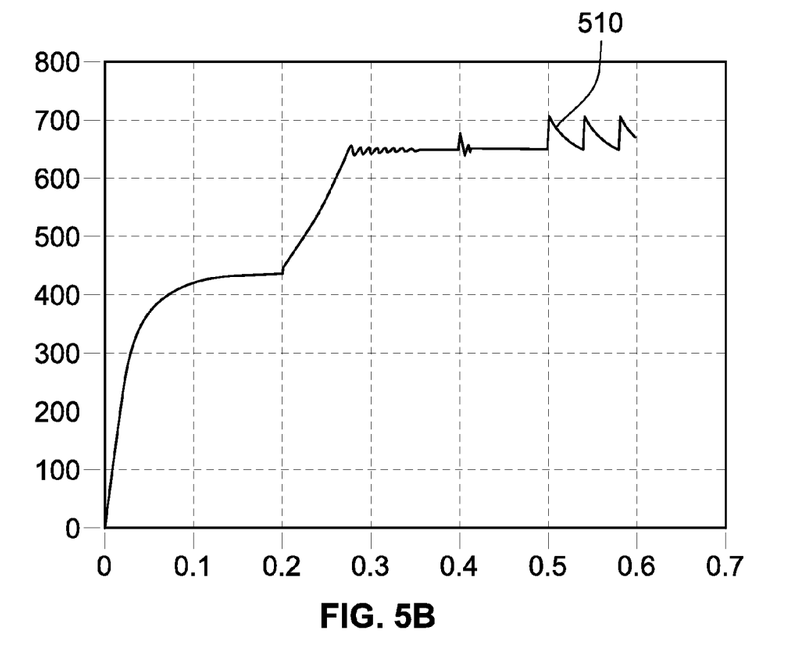
Figure 5C:
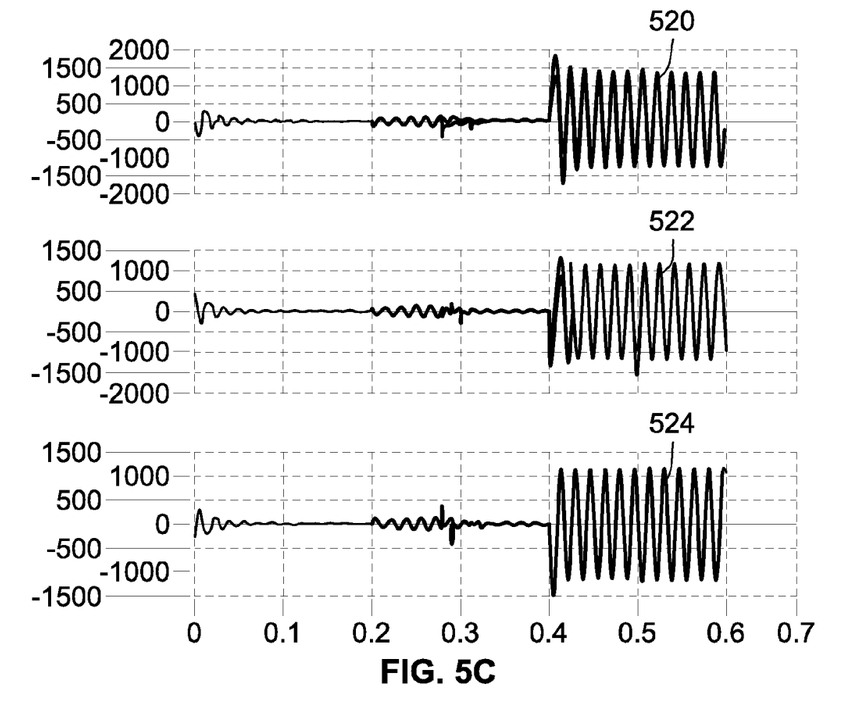

FIG. 5A is a series of voltage graphs with voltage traces 500, 502 and 504 against time of the voltage from each of the three phased voltage inputs of the grid 102. In FIG. 5A, the voltage on the grid 102 drops to 5% of the nominal at 0.5 s seconds in the traces 500, 502 and 504. The bridge 110 is put on line by the controller 130 at 0.3 seconds. The PV source 106 is then placed on line to the grid 102 at 0.4 seconds. The simulation in FIG. 5A uses a PV source such as the PV source 106 in FIG. 1 with an open voltage of 996V, a short circuit current at 673 A and maximum power at 502 kW at 800V as in FIGS. 4A-4C. FIGS. 5A-C show the entire process of the operation of the inverter 104 in FIG. 1 under these conditions.

The voltage regulation of the inverter 104 via the control of the crowbar module 108 is shown in the voltage trace 510 in FIG. 5B which is voltage from the PV source 106 from the crowbar module 108 to the DC input of the bridge 110. As shown in FIG. 5B, the voltage output increases to 650 volts at 0.3 seconds when the PV source 106 is placed on line. The voltage output is maintained at 650 volts between 0.3 seconds and 0.4 seconds. The low voltage condition occurs at the grid 102 at 0.5 seconds and the voltage of the PV source 106 output to the bridge 110 begins to increase. The voltage output of the PV source 106 to the bridge 110 fluctuates between 650V and 700V due to the switching of the crowbar module 108 after the low voltage condition occurs at 0.5 seconds resulting in LVRT operation. The voltage output increases at a slower rate than the voltage output shown in FIG. 4B due to the lower operating voltage.

FIG. 5C shows current traces 520, 522 and 524 of each of the three phase outputs of the bridge 110 coupled to the grid 102. The current reference vector will be set as same as before the low voltage dip causing LVRT operation by the controller 130 controlling the switching devices of the bridge 110 as shown in the output current traces 520, 522 and 524 in FIG. 5C thereby resulting in the same current outputs before and after the LVRT operation occurring at 0.5 seconds.

Figure 6A:
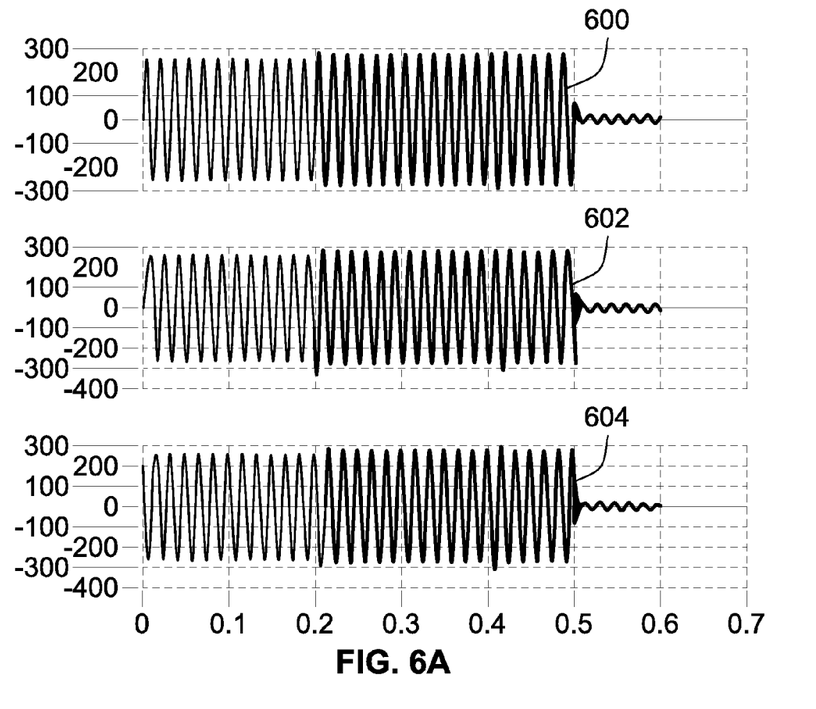
FIG. 6A-6C are simulation results showing grid voltage, voltage regulation and output current using the inverter in FIG. 1 at a PV voltage of 500 volts during LVRT.
Figure 6B:
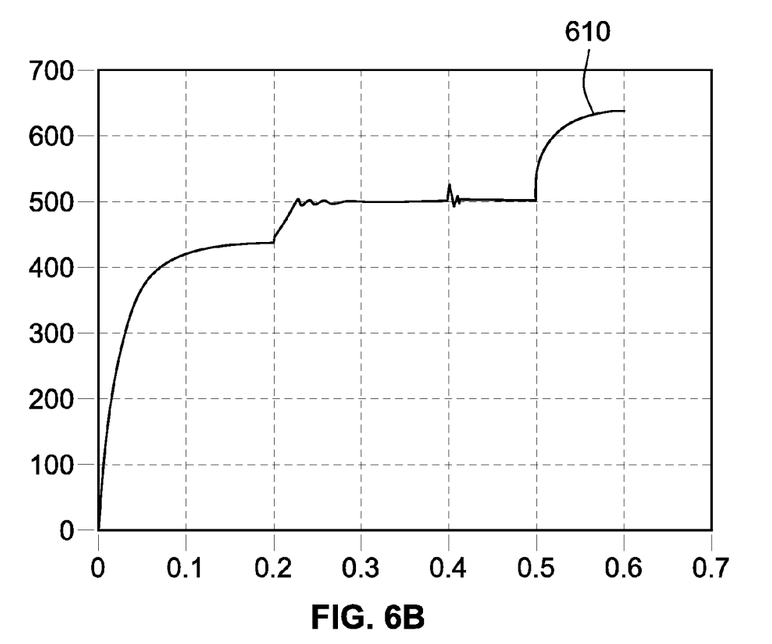
Figure 6C:
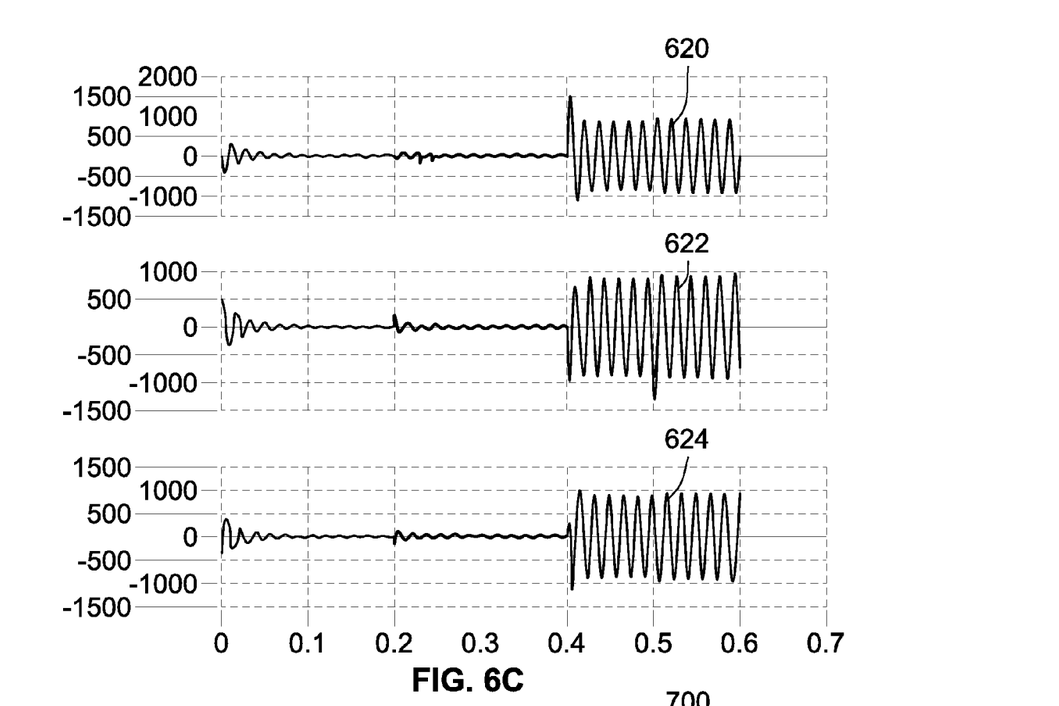

FIG. 6A is a series of voltage graphs including voltage traces 600, 602 and 604 against time of the voltage from each of the three phased inputs of the grid 102. In FIG. 6A, the voltage on the grid 102 drops to 5% of the nominal at 0.5 seconds in the voltage traces 600, 602 and 604. The bridge 110 is put on line by the controller 130 at 0.3 seconds. The PV source 106 is then placed on line to the grid 102 at 0.4 seconds. The simulation in FIG. 6A uses a PV source such as the PV source 106 in FIG. 1 with an open voltage of 996V at the time of the low voltage condition, a short circuit current at 673 A and maximum power at 502 kW at 800V as in FIGS. 4A-4C. FIGS. 6A-C show the entire process of the operation of the inverter 104 in FIG. 1 under these conditions.

The voltage regulation of the inverter 104 via the control of the crowbar module 108 is shown in the voltage trace 610 in FIG. 6B which is voltage from the PV source 106 from the crowbar module 108 to the DC input of the bridge 110. As shown in FIG. 6B, the voltage output increases to 500 volts at 0.3 seconds when the PV source 106 is placed on line. The voltage output is maintained at 500 volts between 0.3 seconds and 0.4 seconds. The low voltage condition occurs at the grid 102 at 0.5 seconds and the voltage of the PV source 106 output to the bridge 110 begins to increase. The voltage output of the PV source 106 to the bridge 110 gradually increases to 640V and stay at this value after 0.5 seconds due to the turn-on of the crowbar module 108 for LVRT operation. Since the resistance of the crowbar 134 shall be selected to sustain the maximum power of the PV source 106 and to maintain the PV voltage at permitted level, for example 850V based on Equation (1) above, the crowbar module 108 is kept on during this LVRT operation.

FIG. 6C shows current traces 620, 622 and 624 of each of the three phase outputs of the power bridge 110 coupled to the grid 102. The current reference vector will be set as same as before the low voltage dip causing LVRT operation by the controller 130 controlling the switching devices of the bridge 110 as shown in the output current traces 620, 622 and 624 in FIG. 6C thereby resulting in the same current outputs before and after the LVRT operation occurring at 0.5 seconds.

Figure 7A:
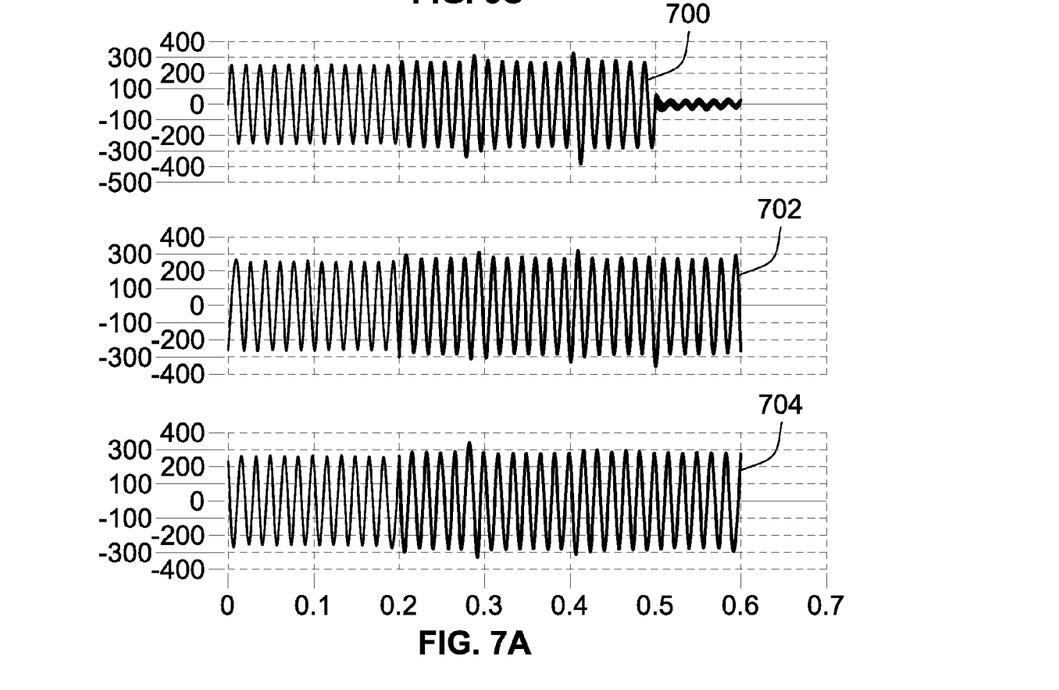
FIG. 7A-7C are simulation results showing grid voltage based on low voltage on one phase of the grid, voltage regulation and output current using the inverter in FIG. 1 at a PV voltage of 600 volts during LVRT.

FIG. 7A is a series of voltage graphs with voltage traces 700, 702 and 704 against time of the voltage from each of the three phase outputs of the grid 102. In FIG. 7A, the voltage on the grid 102 drops to 5% of the nominal at 0.5 seconds in one of the phase outputs of the grid as shown in the trace 700. The voltage output of the other phase inputs remains the same as shown in traces 702 and 704. The bridge 110 is put on line by the controller 130 at 0.3 seconds. The PV source 106 is then placed on line to the grid 102 at 0.4 seconds.

Figure 7B:
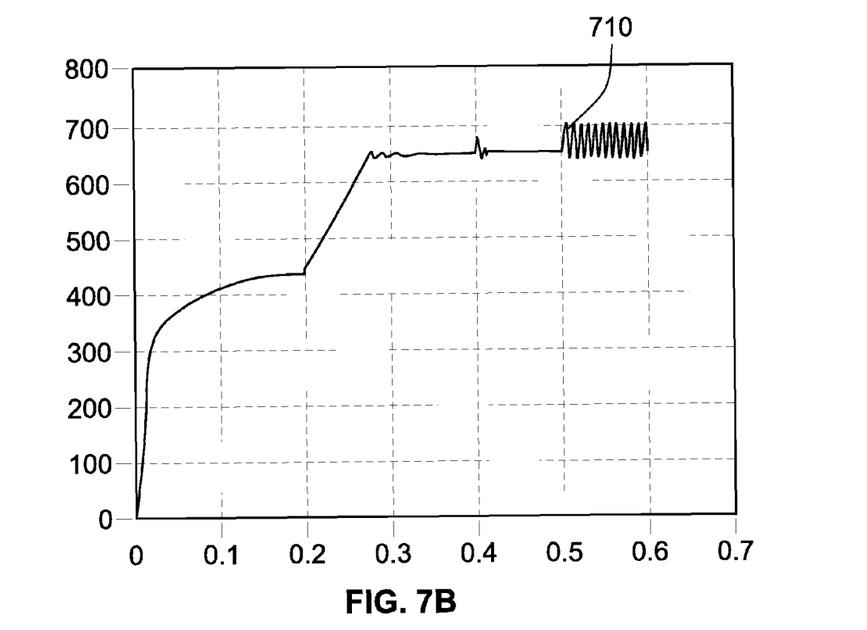

The voltage regulation of the inverter 104 via the control of the crowbar module 108 is shown in the voltage trace 710 in FIG. 7B which is voltage from the PV source 106 from the crowbar module 108 to the DC input of the bridge 110. As shown in FIG. 7B, the voltage output increases to 650 volts at 0.3 seconds when the PV source 106 is placed on line. The voltage output is maintained at 800 volts between 0.3 seconds and 0.4 seconds. The low voltage condition occurs at the grid 102 at 0.5 seconds and the voltage of the PV source 106 output to the bridge 110 begins to increase. The voltage output of the PV source 106 to the bridge 110 fluctuates between 650V and 700V due to the switching of the crowbar module 108 after the low voltage condition occurs at 0.5 seconds resulting in LVRT operation.

Figure 7C:
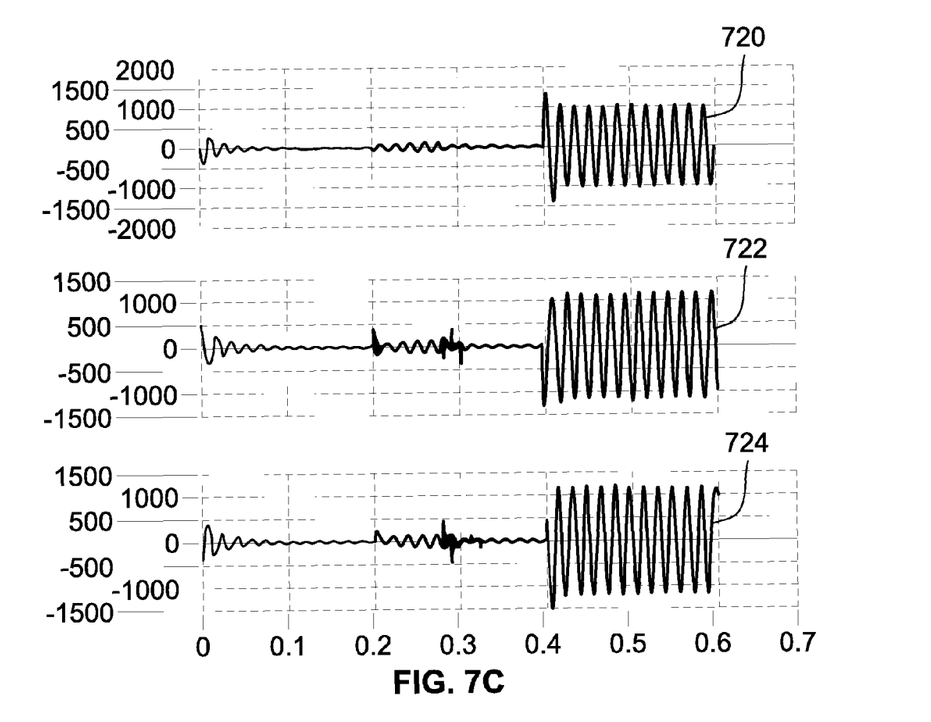

FIG. 7C shows current traces 720, 722 and 724 of each of the three phase outputs of the bridge 110 coupled to the grid 102. The current reference vector will be set as the same as that before the voltage dip causing the LVRT operation by the controller 130 controlling the switching devices of the bridge 110 as shown in the output current traces 720, 722 and 724 in FIG. 7C thereby resulting in the same current outputs before and after the LVRT operation occurring at 0.5 seconds.

The controller 130 in FIG. 1 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein. The controllers may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 8:
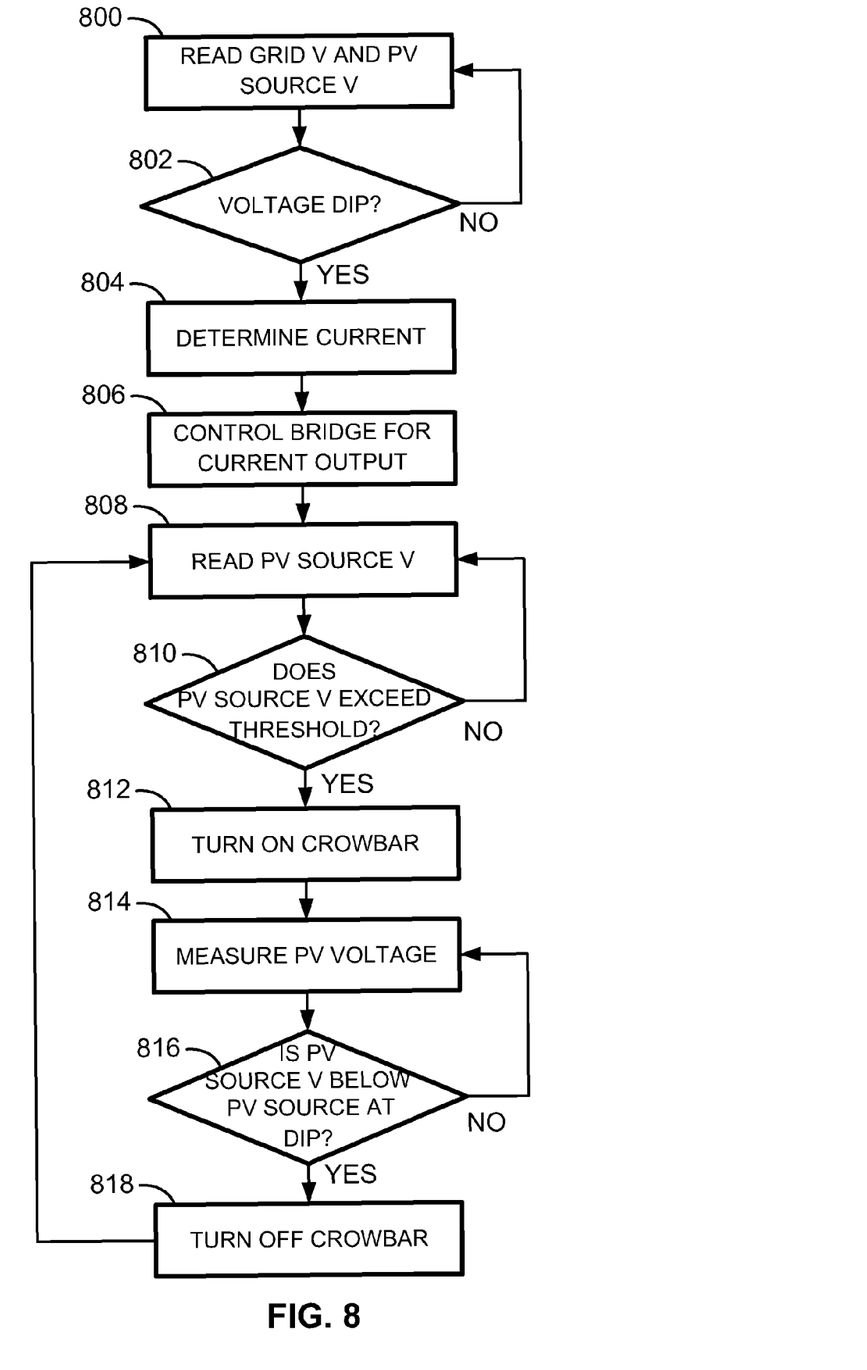
FIG. 8 is a flow diagram of a control algorithm for the inverter in FIG. 1 showing operation during LVRT.

The operation of the example regulation of a power inverter output in LVRT operation to protect components from high voltage, will now be described with reference to FIGS. 1-3 in conjunction with the flow diagram shown in FIG. 8. The flow diagram in FIG. 8 is representative of example machine readable instructions for regulation of a power inverter output in LVRT operation. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the regulation of a power inverter output in LVRT operation could be implemented by software, hardware, and/or firmware. Also, some or all of the machine readable instructions represented by the flowchart of FIG. 8 may be implemented manually. Further, although the example algorithm is described with reference to the flowchart illustrated in FIG. 8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The controller 130 first reads the grid voltage via the voltage sensors 120 and voltage from the PV source 106 via the voltage sensor 114 (800). The controller 130 determines whether the voltage from the grid 102 is lower than a value indicating a voltage dip requiring LVRT operation (802). If the voltage does not constitute a voltage dip, the controller 130 continues to read the grid voltage (800).

If the voltage of the grid 102 dips to a level requiring LVRT operation (802), the controller 130 determines the current level via the current sensors 118 (804). The controller 130 controls the power bridge 110 to regulate the current level from the power bridge 110 to that at the point of the voltage dip (806). The controller 130 reads the voltage level from the PV source 106 (808). The controller 130 determines whether the voltage level from the PV source exceeds the threshold voltage which is the voltage of the PV source 106 at the time of the voltage dip plus ΔV (810). If the voltage of the PV source 106 does not exceed the threshold voltage, the controller continues to measure the voltage of the PV source 106 (808). If the voltage of the PV source exceeds the threshold voltage, the controller 108 turns on the crowbar module 108 thereby closing the switching device 132 and allowing energy from the PV source to dissipate n the resistor 134 (812). The voltage of the PV source 106 to the power bridge 110 begins to fall when the crowbar module 108 is turned on. The controller 130 continues to read the voltage of the PV source 106 to the power bridge 110 (814). The controller 130 determines whether the PV voltage is less than the voltage of the PV source 106 at the time of the voltage dip (816). If the PV voltage is not less than the voltage of the PV source 106 at the time of the voltage dip, the crowbar module 108 stays on. If the PV voltage is less than the voltage of the PV source 106 at the time of the voltage dip, the crowbar module 108 is turned off (818), and the voltage from the PV source 106 to the power bridge 110 rises. The controller 130 then continues to read voltage of the PV source 106 (808).

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of regulating voltage output of an inverter coupled between a photovoltaic source and a power grid to perform a low voltage ride through (LVRT) operation, the method comprising:
   sensing an occurrence of low voltage on the power grid;
   monitoring an operating voltage of the photovoltaic source;
   identifying the operating voltage of the photovoltaic source just prior to the occurrence of low voltage on the power grid;
   controlling a crowbar circuit with a switching device in parallel with the photovoltaic
   source to close in response to sensing the operating voltage of the photovoltaic source at a predetermined threshold level above the operating voltage of the photovoltaic source just prior to the occurrence of low voltage on the power grid, the closed crowbar circuit dissipating power from the photovoltaic source; and
     controlling the crowbar circuit to open in response to sensing the operating voltage of the photovoltaic source at a level substantially the same as the operating voltage of the photovoltaic source just prior to the occurrence of low voltage on the power grid; and
   operating the switching device, during a low voltage ride through period, to open and close the crowbar circuit to fluctuate the operating voltage of the photovoltaic source between the operating voltage of the photovoltaic source just prior to the occurrence of low voltage on the power grid and the predetermined threshold level, to maintain a current output of the inverter substantially identical to the current output of the inverter just prior to the occurrence of low voltage on the power grid.

2. The method of claim 1, wherein the switching device is an insulated gate bipolar transistor.

3. The method of claim 1, wherein the crowbar circuit includes a diode and a resistor in parallel with each other and in series with the switching device.

4. The method of claim 3, wherein the resistance value of the resistor is chosen by:

$$R=(V_{pv\text{-}max}+\Delta V)^2/P_{pv\text{-}max}$$

where $V_{pv\text{-}max}$ is the maximum voltage at a maximum power point of the PV source, $P_{pv\text{-}max}$ is the maximum power of the photovoltaic source and $\Delta V$ is a value that is a function of the maximum voltage of the photovoltaic source.

5. The method of claim 1, wherein the occurrence of low voltage on the power grid is at substantially zero volts.

6. The method of claim 1, wherein the inverter includes a power bridge including a plurality of medium voltage switching devices.

7. The method of claim 6, wherein the switching devices are insulated gate bipolar transistors.

8. The method of claim 1, wherein the maximum voltage for the crowbar circuit is selected to regulate at a predetermined voltage range on the LVRT operation.

9. The method of claim 1, wherein the predetermined threshold level is $\Delta V$ above the operating voltage of the photovoltaic source just prior to the occurrence of low voltage on the power grid, wherein $\Delta V$ is substantially 10% of a minimum voltage output of the photovoltaic source.

10. The method of claim 6, further comprising modeling current of the power bridge before the occurrence of low voltage on the power grid is sensed and applying the modeled current by controlling the power bridge during the LVRT operation.

11. A photovoltaic inverter for coupling a direct current photovoltaic (PV) source to an alternating current electrical grid and performing a low voltage ride through (LVRT) operation, the inverter comprising:
   a power bridge to convert direct current voltage to alternating current voltage, the power bridge coupled to the electrical grid;
   a switching crowbar coupled to the PV source and the power bridge, the crowbar having a switching device having a closed position causing the switching crowbar to dissipate energy from the PV source and an open position to allow direct output from the PV source to the power bridge;
   a first voltage sensor to detect a low voltage condition on the electrical grid;
   a second voltage sensor to monitor an operating voltage of the PV source; and
   a controller coupled to the first and second voltage sensors and configured to:
     record the operating voltage of the PV source just prior to the low voltage condition on the electrical grid;
     control the switching device of the switching crowbar to close in response to sensing the operating voltage of the PV source at a predetermined threshold level above the operating voltage of the PV source just prior to the low voltage condition on the electrical grid;
     control the switching device of the switching crowbar to open in response to sensing the operating voltage of the PV source at a level substantially the same as the operating voltage of the PV source just prior to the low voltage condition on the electrical grid; and
     control, during a low voltage ride through period, the switching device of the switching crowbar in the open and closed positions to fluctuate the operating voltage of the PV source between the operating voltage of the PV source just prior to the low voltage condition on the electrical grid and the predetermined threshold level, to maintain a current output of the inverter substantially identical to the current output of the inverter just prior to the low voltage condition on the electrical grid.

12. The inverter of claim 11, wherein the switching device is an insulated gate bipolar transistor.

13. The inverter of claim 11, wherein the switching crowbar includes a diode and a resistor in parallel with each other and in series with the switching device.

14. The inverter of claim 13, wherein the resistance value of the resistor is chosen by:

$$R=(V_{pv\text{-}max}+\Delta V)^2/P_{pv\text{-}max}$$

where $V_{pv\text{-}max}$ is the maximum voltage at a maximum power point of the PV source, $P_{pv\text{-}max}$ is the maximum power of the PV source and $\Delta V$ is a value that is a function of the maximum voltage of the PV source.

15. The inverter of claim 11, wherein the low voltage condition on the electrical grid is at substantially zero volts.

16. The inverter of claim 11, wherein the power bridge includes a plurality of medium voltage switching devices.

17. The inverter of claim 16, wherein the switching devices are insulated gate bipolar transistors.

18. The inverter of claim 11, wherein the maximum voltage for the switching crowbar is selected to regulate at a predetermined voltage range on the LVRT operation.

19. The inverter of claim 11, wherein the predetermined threshold level is $\Delta V$ above the operating voltage of the PV source just prior to the low voltage condition on the electrical grid, wherein $\Delta V$ is substantially 10% of a minimum voltage output of the PV source.

20. The inverter of claim 11, wherein the controller models current of the power bridge before the low voltage condition is detected and applies the modeled current by controlling the power bridge during the LVRT operation.

* * * * *